Inventor,
Joseph J. Coleman,
By: Jones, Darbo & Robertson,
Attys.

Aug. 25, 1959      J. J. COLEMAN      2,901,669
DAYTIME OFF SOLAR CELL FLASHER CIRCUIT
Filed June 6, 1958

Inventor,
Joseph J. Coleman,
By: Jones, Darbo & Robertson, Attys.

United States Patent Office 2,901,669
Patented Aug. 25, 1959

2,901,669

DAYTIME OFF SOLAR CELL FLASHER CIRCUIT

Joseph J. Coleman, Freeport, Ill., assignor, by mesne assignments, to Servel, Inc., Evansville, Ind., a corporation of Delaware Application June 6, 1958, Serial No. 740,243

7 Claims. (Cl. 315—158)

This invention relates to flasher signals and more specifically refers to a unit operated by transistors and one which is automatically disabled during the daylight period.

Flasher warning signals have become widely used for many purposes. They are used to warn motorists and pedestrians at night in road repair and excavation areas, and are also used to warn motorists of obstacles present on the highways. These units generally comprise a lamp whose circuit is intermittently switched on and off by means of a mechanically controlled flasher unit. More recently switching circuits utilizing transistors have been proposed for this purpose. However, all units of this type must be manually turned off during daylight hours if the batteries are to be conserved. This requires the expenditure of many man-hours of labor where a large installation of such warning devices is used, especially if the devices are placed at distances remote from one another.

It is an object of this invention to provide an apparatus which may be used to generate flashing warning signals, which is fool-proof and will operate over long periods of time without attention.

It is a further object to provide such a flasher unit which will be automatically disabled during daylight hours to conserve electrical energy of its batteries, and automatically reactivated with the approach of darkness.

Other objects and advantages of the present invention will be apparent from an examination of the following description and drawings in which.

According to the present invention it has been found that if photoelectric devices, especially solar cells, in sufficient number and in the proper arrangement are placed in the control circuit of at least one of the transistors of a transistor-operated flasher in such an arrangement that when light strikes the cells, they will so bias the transistors in the circuit to stop the conduction of the current thereby, normal operation of the flasher unit will not be interfered with during darkness, but during daylight hours the unit will automatically remain out of operation. The operation of the invention will be more fully explained in the following description.

Figure 1:
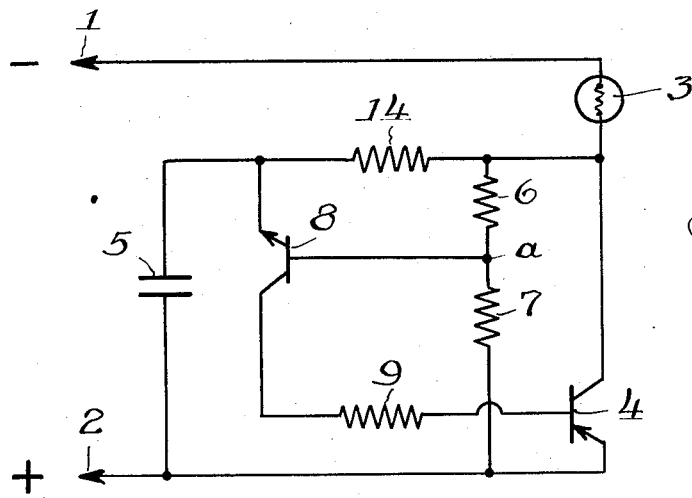
Fig. 1 is a schematic diagram of a transistor-operated flasher unit disclosed in the art.

Referring to Fig. 1, a battery (not shown) supplies current in this known circuit at terminals 1 and 2. A lamp 3 and a P-N-P junction transistor 4 are placed in series in a grounded collector circuit. The base of the transistor 4 is normally biased to prevent a flow of current from the emitter through the base to the collector. This results in only a very minute current flow in the lamp circuit. During the period when there is substantially no flow through the transistor 4, a small current flows through the lamp 3 and resistor 4 to charge the condenser 5 which in effect is connected between the positive and negative terminals with resistor 14 and lamp 3 in series therewith. Resistors 6 and 7 together constitute a potentiometer. The potentiometer mid-terminal *a* is connected to the base of an N-P-N junction transistor 8 and provides the biasing current for the transistor. When voltage is first applied across the terminals 1 and 2, the transistor 4 is so biased that it will allow substantially no current to flow through the emitter-collector circuit, and as a result the bulb 3 does not light. As the condenser 5 becomes charged, the potential difference across its terminals increases, also increasing the potential difference across the resistances 6 and 7. Part of the current passing through the bulb 3 goes through resistor 14 to charge condenser 5, and a part goes through resistances 6 and 7 to terminal 2. Before the condenser is charged, the potential at mid-terminal *a* is not great enough to trigger the transistor 8. However, when the condenser reaches the state where it is substantially fully charged, the potential at *a* rises to a value sufficient to trigger the transistor. This causes the condenser 5 to discharge through the emitter-collector circuit of the N-P-N transistor 8, through resistor 9, through the base-emitter circuit of the P-N-P transistor 4 to the positive terminal 2. This discharge current through the base-emitter circuit of the P-N-P transistor triggers it by biasing it in a forward direction to allow the current to flow therethrough to light up the bulb. The bulb will be lit during the interval of condenser discharge. Thereafter, the bias applied to the P-N-P transistor once more substantially cuts off the current through the lamp, causing it to become extinguished. With the lamp current off, the condenser 5 can once more begin to charge.

This sequence will be continually repeated to cause intermittent flashes of light. The rate of charge of the condenser 5 is controlled by the value of the resistor 14 together with the resistance of the lamp 3. The rate of discharge of the condenser is determined by the value of the resistor 9. Consequently, the interval during which the lamp remains on and off during the blinking cycle as well as the frequency of the cycle may be determined by the choice of the values of these resistors, together with the value of the condenser 5.

Figure 2:
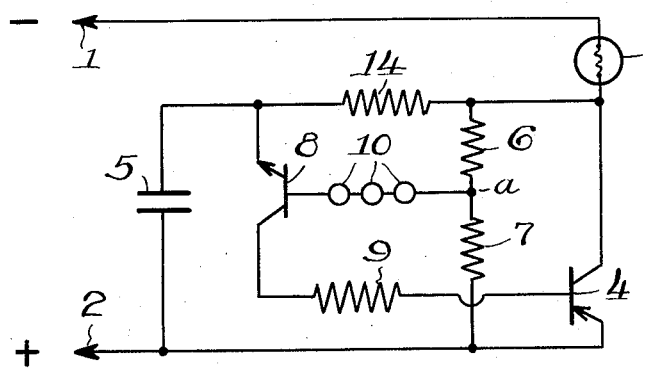
Fig. 2 is a schematic diagram of a transistor-operated flasher unit of the present invention utilizing solar cells to prevent its operation during daylight hours.

Referring to Fig. 2, a circuit similar in arrangement and operation to that of Fig. 1 is shown except that solar cells 10 have been inserted between the potentiometer mid-terminal *a* and the base of the transistor 8. The solar cells are so arranged that when no light shines upon their activating surfaces, the current is free to flow from the terminal *a* to the transistor base, but that when light shines on their surfaces, the current supplied by the solar cells opposes the biasing current supplied by the terminal *a*. Thus, during darkness the flasher circuit works in the same manner as the circuit shown in Fig. 1. However, during daylight hours when light falls upon the solar cells, the transistor 8 is so biased by the current produced in the solar cells that it cannot be triggered to discharge the condenser 5. As a result the condenser 5 will remain in a charged state and the lamp 3 will not flash. With the approach of darkness, the effect of the solar cells is eliminated and normal operation of the flasher is resumed.

Figure 3:
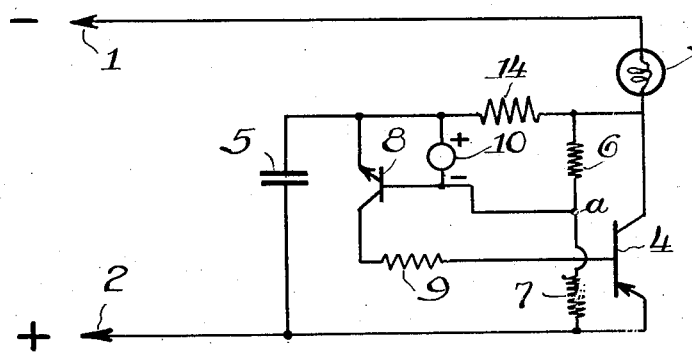
Figs. 3–7 are schematic diagrams of alternative forms of the invention.

Fig. 3 illustrates schematically an alternative form of the present invention. Here a solar cell 10 is connected across the base and emitter of the N-P-N transistor 8. When light falls on the cell, a current is produced which biases the N-P-N transistor so that the condenser 5 cannot discharge therethrough, and the condenser remains charged until the disabling voltage applied by the solar cell is removed, at which time the flasher circuit resumes normal operation.

Figure 4:
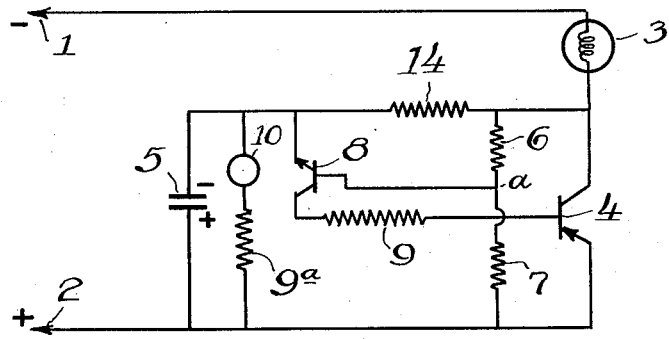

Fig. 4 shows another circuit arrangement using the solar cell control. Here the disabling function is accomplished by having the current resulting from light energy falling on the solar cell flow in such a direction as to prevent the condenser 5 from becoming charged. The emitter of the N-P-N transistor 8 becomes positive with the result that the transistor does not conduct current. Consequently, as long as the solar cell is activated, the P-N-P transistor 4 is so biased by the N-P-N transistor 8 that the lamp does not light.

Figure 5:
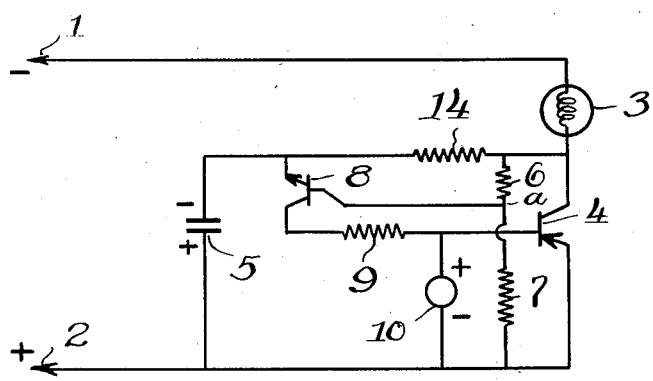

Fig. 5 shows still another circuit arrangement which is quite sensitive and which may be operated with the use of only a single solar cell 10. The solar cell when illuminated produces a bias current across the base and emitter of the P-N-P transistor 4. As a result, the transistor is never in the conducting condition as long as the solar cell is activated.

Figure 6:
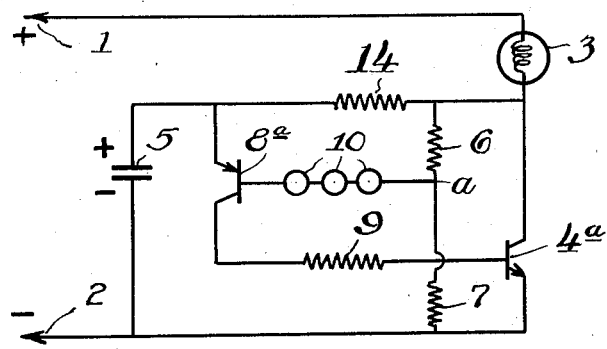

Fig. 6 illustrates a circuit similar to that of Fig. 2, but in which the transistors are interchanged. P-N-P transistor 8a is controlled by solar cells 10 and triggered by condenser 5, while N-P-N transistor 4a controls the lamp circuit. The resulting operation, however, is similar to that of the circuit in Fig. 2.

Figure 7:
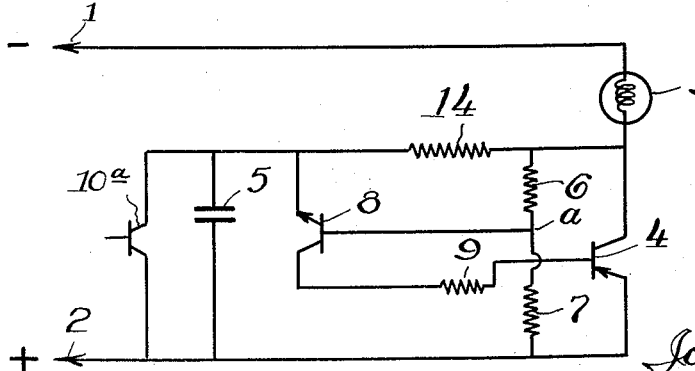

Fig. 7 illustrates a circuit wherein the solar cell has been replaced by a photo-resistive device such as a photodiode, an example being the 1N77 Germanian diode. When light falls on the sensitive portion of the photo-resistive device 10a, the resistance decreases so that the condenser 5 canot become charged. In darkness, the resistance of the diode becomes high, allowing the condenser to become charged, and the normal function of the flasher circuit to be resumed.

The term "solar cell" as used in the specification and claims refers to the photronic or photovoltaic type, i.e. cells which generate a large amount of electrical current when they are subjected to light radiation, as opposed to photocells which establish electrical potential but produce very little current. Among the suitable types of solar cells is the B-2M self-generating selenium cell sun battery. Although other photoelectric devices described in relation to this invention may be used, greatly superior results may be obtained with solar cells since they have the ability to supply the rather large currents needed to control transistors. It is possible to use photoconductive cells such as the Clairex CL-2 or CL-3 which are of the cadmium sulfide or cadmium selenide types, but the results obtained will be considerably inferior to those obtained with solar cells.

The number of solar cells required in a particular circuit of the present invention varies with the application and with the type of circuit used. In the circuit of Fig. 2, several solar cells in series are indicated. On the other hand, the circuits of Figs. 3, 4 and 5 are somewhat more sensitive and the use of only one solar cell is satisfactory. Where the flashing devices are to be used under poor illumination, it may be necessary to increase the number of solar cells used.

Among the suitable semi-conductive devices which may be used are transistors of the point contact, surface barrier, or junction type. The junction transistor is preferred. In order that the circuits function properly, the transistors should be oppositely conducting with respect to each other. For example, if the transistor acting as a switch for the lamp current is a P-N-P type, the triggering transistor should be an N-P-N type. On the other hand, if the switching transistor is an N-P-N type, the triggering transistor should be a P-N-P type. The preferred arrangement is to have a P-N-P junction transistor as the switching transistor and an N-P-N junction transistor as the triggering transistor.

Although they are not to be considered as limiting in any way, following are listed suitable values which may be used for the various components in the circuits shown in the figures.

| | |
|---|---|
| Resistor 14 ohms | 5600 |
| Resistor 6 do | 2200 |
| Resistor 7 do | 6800 |
| Resistor 9 do | 680 |
| Condenser 5 mfd | 50 |

The lamp may be one designed to operate at 5 volts at .09 amps. The P-N-P transistors 4 and 8a may be any one, for example, of types 2N188A, 2N186, 2N189, or 2N319. The N-P-N transistor may be any one, for example, of types JD2A10, 2N169A, or 2N35. In some cases it may be necessary to change the values of the resistors somewhat in accordance with the known characteristics of the transistors, to provide proper biasing and electrode currents.

The flasher devices of the present invention have many advantages. Because they utilize transistors, they will operate almost indefinitely without attention or need for part replacement. The incorporation of an automatic turn-off during daylight hours accomplishes a large saving in operating costs, since the only current drain during daylight hours comprises the extremely small leakage through the condenser and extremely small current across the transistor junction. Because of the automatic turn-off feature, the need for a crew of men in a multiple installation to turn the flashers on each night and to turn them off each morning is obviated. Additionally, the flasher devices will operate over long periods of time without the need for battery change since the current drain is so exceptionally low.

I claim:

1. In an electric lamp flasher comprising a pair of terminals adapted to be connected to a direct current source, an electric lamp in series circuit therewith, a pair of semiconductive devices each of which is of an oppositely conducting type with respect to the other, each of said devices having a control element and a pair of load elements, the load elements of the first of said semiconductive devices being in series with said lamp circuit, and the control element of said first semiconductive device being connected to a load element of said second semiconductive device, and means for intermittently applying a current to the control element of said second semiconductive device, the improvement which comprises means for disabling said flasher during daylight, said means comprising a solar cell connected to said second semiconductive device to bias it to the conducting condition when less than a predetermined amount of light falls on said photoelectric device and to the nonconducting condition when more than said predetermined amount of light falls on said photoelectric device.

2. An electric lamp flasher according to claim 1 wherein said semi-conductive devices are junction transistors.

3. An electric lamp flasher according to claim 2 wherein said means for intermittently applying a current to the control element of said second semiconductive device is a capacitance-resistance network connected to said direct current source.

4. In an electric lamp flasher comprising a pair of terminals adapted to be connected to a direct current source, an electric lamp in series circuit therewith, a pair of transistors each of which is of an oppositely conducting type with respect to the other, each of said transistors having a base, an emitter, and a collector, the emitter and collector of the first of said transistors being in series with said lamp circuit and the base of said transistor being connected to collector of said second transistor, and means for intermittently applying a current to the base and collector of said second transistor, the improvement which comprises means for disabling said flasher during daylight, said means comprising a solar cell connected to said second transistor to bias it to the conducting condition when less than a predetermined amount of lights falls on said photoelectric device and to the nonconducting condition when more than said predetermined amount of light falls on said photoelectric device.

5. An electric lamp flasher according to claim 4 wherein said first transistor is of the P-N-P type and said second transistor is of the N-P-N type.

6. An electric lamp flasher according to claim 4 wherein said first transistor is of the N-P-N type and said second transistor is of the P-N-P type.

7. In an electric lamp flasher comprising a pair of terminals adapted to be connected to a direct current source, an electric lamp in series circuit therewith, a pair of junction transistors one being of the P-N-P type and the other of the N-P-N type, each of said transistors having a base, an emitter and a collector, the emitter and collector of the P-N-P transistor being in series with said lamp circuit, and the base of the P-N-P transistor being connected to the collector of the N-P-N transistor, a condenser connected to be charged by said direct current source, one of the terminals of said condenser being connected to the emitter of the N-P-N transistor, the other terminal of said condenser being connected to the emitter of the P-N-P transistor, a pair of resistors in series forming a voltage divider connected across the terminal of said capacitor, the junction between said series-connected resistors being connected to the base of said N-P-N transistor, the improvement which comprises means for disabling said flasher during daylight, said means comprising one or more solar cells connected in series between the base of said second transistor and the junction between said series-connected resistors, said solar cells biasing said N-P-N transistor to the non-conducting condition when more than a predetermined amount of light is falling on said solar cells, and allowing said N-P-N transistor to become biased to the conducting condition when less than said predetermined amount of light falls on said solar cells.

References Cited in the file of this patent

UNITED STATES PATENTS

| | | |
|---|---|---|
| 2,773,219 | Aron | Dec. 4, 1956 |
| 2,788,449 | Bright | Apr. 9, 1957 |
| 2,825,003 | Hanson | Feb. 25, 1958 |
| 2,829,257 | Root | Apr. 1, 1958 |
| 2,833,938 | Pinckaers | May 6, 1958 |
| 2,840,727 | Guggi | June 24, 1958 |